United States Patent
Kusner et al.

(10) Patent No.: US 9,651,684 B1
(45) Date of Patent: May 16, 2017

(54) RADIATION DETECTOR

(71) Applicant: Saint-Gobain Ceramics & Plastics, Inc., Worcester, MA (US)

(72) Inventors: Michael R. Kusner, Auburn Township, OH (US); Peter R. Menge, Novelty, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 3 days.

(21) Appl. No.: 14/317,037

(22) Filed: Jun. 27, 2014

Related U.S. Application Data (60) Provisional application No. 61/841,299, filed on Jun. 29, 2013.

(51) Int. Cl.
*G01T 1/20* (2006.01)
*G01T 1/208* (2006.01)
*G01T 3/06* (2006.01)

(52) U.S. Cl.
CPC ............... *G01T 1/208* (2013.01); *G01T 3/06* (2013.01)

(58) Field of Classification Search
CPC ............... G01T 1/20; G01T 3/06; G01T 3/08
USPC .................. 250/362, 390.11, 361 R
See application file for complete search history.

(56) References Cited

U.S. PATENT DOCUMENTS

| | | | | |
|---|---|---|---|---|
| 3,988,586 A * | 10/1976 | Stuart et al. | ............ | 250/390.11 |
| 4,002,909 A * | 1/1977 | Packard et al. | ............ | 250/328 |
| 4,482,808 A * | 11/1984 | Tominaga et al. | ............ | 250/392 |
| 6,207,953 B1 * | 3/2001 | Wilson | ............ | 250/269.4 |
| 6,639,210 B2 * | 10/2003 | Odom et al. | ............ | 250/269.6 |
| 6,781,115 B2 * | 8/2004 | Stoller et al. | ............ | 250/266 |
| 6,894,274 B2 * | 5/2005 | Valant-Spaight | ............ | 250/269.4 |
| 7,081,626 B2 * | 7/2006 | Ianakiev et al. | ............ | 250/363.07 |
| 7,372,041 B1 * | 5/2008 | Nagarkar et al. | ............ | 250/390.11 |
| 7,491,929 B2 * | 2/2009 | Truax | ............ | 250/269.6 |
| 7,626,178 B2 * | 12/2009 | Ivan et al. | ............ | 250/390.11 |
| 8,445,852 B2 * | 5/2013 | Takahashi et al. | ............ | 250/369 |
| 2006/0054863 A1 * | 3/2006 | Dai et al. | ............ | 252/301.4 R |
| 2007/0131866 A1 * | 6/2007 | Srivastava et al. | ............ | 250/367 |

* cited by examiner

*Primary Examiner* — David Porta
*Assistant Examiner* — Djura Malevic
(74) *Attorney, Agent, or Firm* — Abel Law Group, LLP (57) ABSTRACT

A radiation detector can include both an upper-level and a low-level discriminator. Pulses with amplitudes below a lower pre-selected value will be discarded as noise by the low-level discriminator. Only pulses with amplitudes at or above the lower pre-selected amplitude but at or below a second higher pre-selected value will be subjected to PSD to distinguish between pulses corresponding to neutrons and pulses corresponding to gamma rays. Pulses with amplitudes above the second higher pre-selected value of the upper-level discriminator will be counted as neutron or ionic particle pulses without subjecting these pulses to any PSD.

20 Claims, 7 Drawing Sheets

RADIATION DETECTOR

CROSS-REFERENCE TO RELATED APPLICATION

This application claims priority under 35 U.S.C. §119(e) to U.S. Provisional Application No. 61/841,299 entitled "Scintillator Detector" by Kusner et al., filed on Jun. 29, 2013. The above-referenced application is assigned to the current assignee hereof and is incorporated herein by reference in its entirety.

FIELD OF THE DISCLOSURE

The present disclosure is directed to radiation detectors, particularly radiation detectors capable of detecting neutrons or ionized particles.

BACKGROUND

Neutron detectors are used in a variety of applications, such as physics research, geophysical applications, security screening, military applications, or the like. Typical neutron detectors make use of scintillators, which are materials that emit light upon interaction with radiation particles. The light passes to a photodetector device, such as a photomultiplier tube, which converts the photons (light) emitted from the scintillator into electrical pulses. The electrical pulses can be processed by associated electronics and may be registered as counts that are transmitted to analyzing equipment.

Helium-3 neutron detectors are the accepted standard in neutron detectors. Unfortunately, however, the availability of $^3$He is very limited when compared to the worldwide demand. Although there are a number of known alternative detectors, these neutron detectors tend to have a much greater gamma response than $^3$He neutron detectors. A higher sensitivity to gamma rays can result in too many false positive counts where a gamma ray interaction is incorrectly identified as a neutron interaction. Because the presence of neutrons typically indicates the presence of fissile materials while gamma rays can be emitted from non-fissile, but naturally radioactive materials, the ability to accurately distinguish between the two types of particles is important for security and nuclear safety applications.

Accordingly, further improvement of neutron detectors, particularly neutron detectors using solid scintillators, is desired.

BRIEF DESCRIPTION OF THE DRAWINGS

The present disclosure may be better understood, and its numerous features and advantages made apparent to those skilled in the art by referencing the accompanying drawings.

The accompanying drawings are not intended to be drawn to scale. In the drawings, each identical or nearly identical component that is illustrated in various figures is represented by a like numeral. For purposes of clarity, not every component may be labeled in every drawing.

DESCRIPTION OF THE DRAWINGS

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Unlike helium-3 neutron detectors, most alternative neutron detectors using solid scintillators are sensitive to both neutron and gamma interactions. These detectors are prone to producing false neutron counts (false positives) when gamma ray particles interact with the scintillator material. As a result, neutron-gamma discrimination is an important issue in many areas such as for homeland security, physics research, and military applications.

One common method of distinguishing neutron interactions from gamma ray interactions is referred to as pulse shape discrimination (PSD). Although a variety of different PSD techniques are known, the basis for all types of PSD used with scintillation detectors is the fraction of prompt fluorescence and delayed fluorescence light produced by a given radiation type. That is to say, different radiation types will produce pulses of differently shaped pulse amplitude profiles in terms of current from the anode of the photodetector vs. time.

Figure 1:
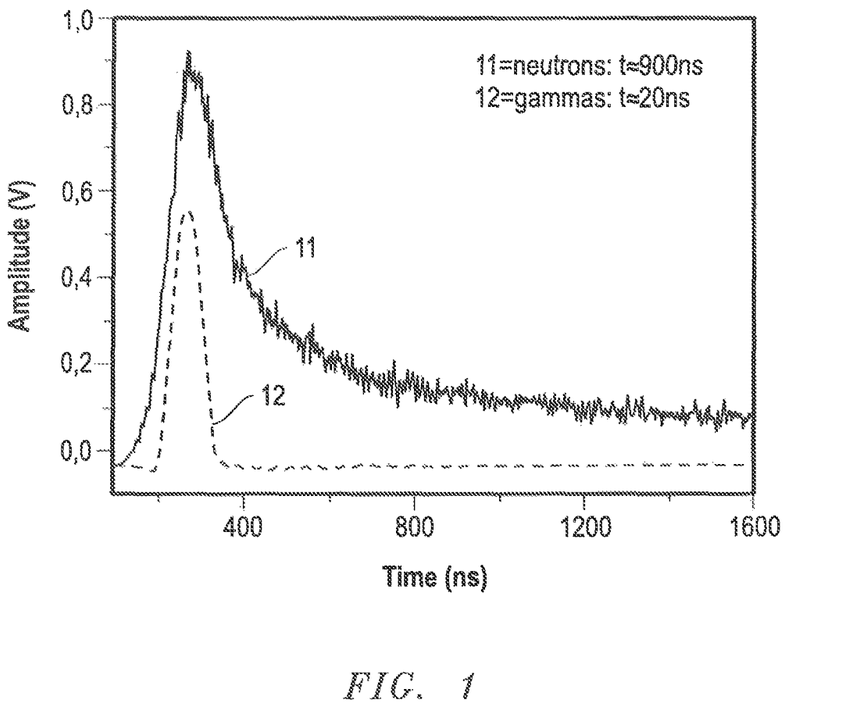
FIG. 1 is a graph of amplitude vs. time for averaged neutron and gamma pulses.

For neutron and gamma ray interactions with many solid scintillator materials, intrinsic differences in the excitation processes associated with the neutron and gamma-ray interactions allow these particles to be distinguished. FIG. 1 is a typical graph of amplitude as a function of time for averaged neutron and gamma pulses. The decay time for gamma-ray interactions are typically on the order of 100 ns, whereas for neutron interactions the decay time is almost a microsecond. Because the differences in decay time constants between neutron and gamma-ray pulses are so large, a number of different mathematical techniques have been developed to distinguish between neutron and gamma ray interactions.

Unfortunately, however, even using advanced pulse shape discrimination techniques, it is still difficult to achieve desired levels for false positives resulting from gamma ray detection. Current design objectives are to have no more than one false positive per million gamma ray interactions.

Figure 2:
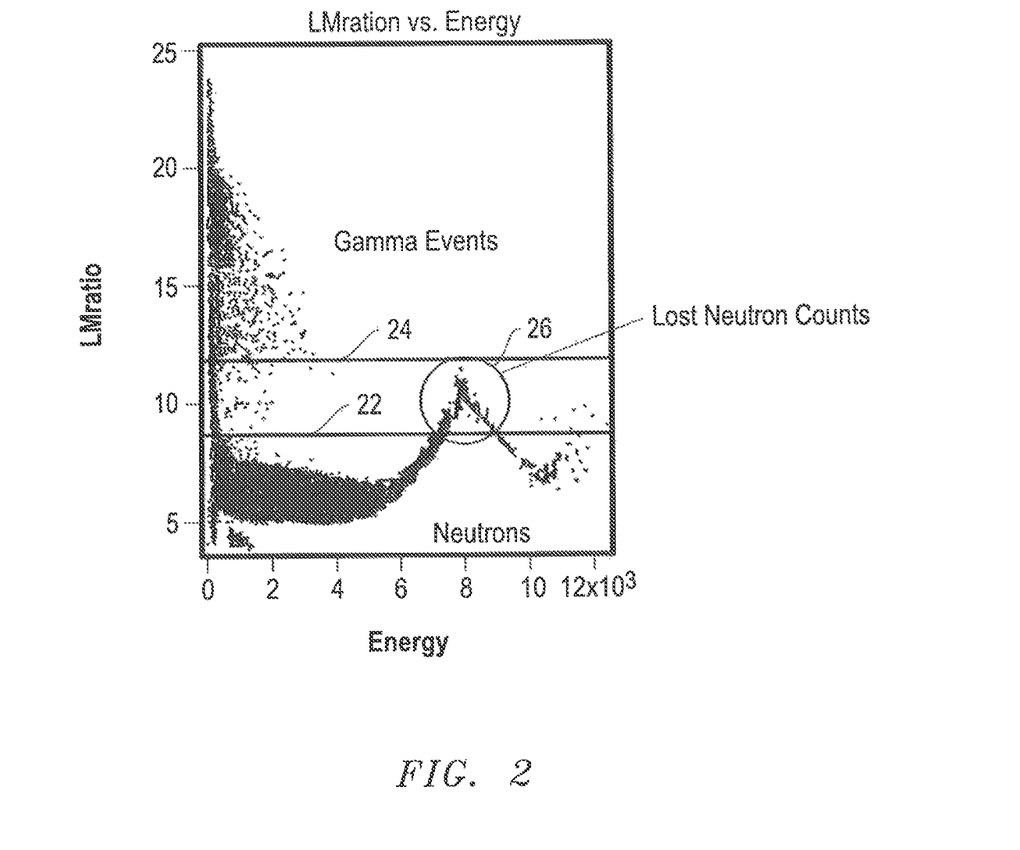
FIG. 2 is a graph showing LM ratio (the PSD parameter) and energy level (signal amplitude) for electronic signal pulses from the anode of a photodetector in a radiation detector.

FIG. 2 is a graph showing the PSD parameter and energy level (signal amplitude) for electronic signal pulses from the anode of a photodetector in a radiation detector. Here, the PSD parameter is the ratio of the maximum of the Fourier transform of the signal to the total sum of the Fourier transformed signal. Typically, the PSD acceptance level of about 8.5 (line 22) would be set so that everything above that level would be counted as a gamma event, while everything at or below that level would be counted as a neutron event.

Applicant has discovered that, surprisingly, that in phenomena with a wide dynamic range (over 2 orders of magnitude, for example) adjusting the discrimination parameters to eliminate events due to gamma ray interactions is often causing authentic neutron events to be rejected. As shown in FIG. 2, the PSD parameter for a range of higher energy neutron events shows an upward drift resulting in a number of authentic neutron events (within circle 26) being above the PSD acceptance level. As a result, these neutron events would not be counted. As also shown, if the PSD acceptance level were raised to about 11 (line 24), a number of gamma events would be falsely counted as neutron events.

The upturn in the PSD parameter for this range of higher energy neutron events appears to result from the broad dynamic range of the signal pulses themselves. High amplitude (energy) pulses can saturate the input circuit of a system's signal processing electronics. This saturation causes an overflow in one of the parameters of the pulse shape discrimination algorithm and leads to anomalies in the PSD spectrum. When the system parameters are adjusted to eliminate events due to gamma rays the anomalies in the PSD spectrum cause some neutron events to be rejected. Specifically in FIG. 2, large amplitude input signals saturate either the amplifier or analog-to-digital converter (ADC). The saturated signal causes an overflow in one of the field programmable gate array (FPGA) registers.

A radiation detector can include a radiation sensing element and a photosensor. In an embodiment the radiation detector can be a neutron detector and include a neutron sensor. As described below, the radiation sensing element can comprise a scintillator. The photosensor is preferably optically coupled to the radiation sensing element and operative to convert photons emitted by the scintillator, when the scintillator is used as the radiation sensing element, into an electronic signal pulse. In a particular embodiment, the radiation detector also includes both an upper-level and a low-level discriminator. Pulses with amplitudes below a lower pre-selected value will be discarded as noise by the low-level discriminator. Pulses with amplitudes at or above the lower pre-selected amplitude but at or below a second higher pre-selected value will be subjected to PSD to distinguish between pulses corresponding to neutrons or ionic particles and pulses corresponding to gamma rays. And finally, pulses with amplitudes above the second higher pre-selected value will be counted as neutron or ionic particle pulses without subjecting these pulses to any PSD discrimination. The discussion below will address gamma rays and neutrons to simplify understanding of the embodiments. After reading this specification, skilled artisans will appreciate that embodiments can be used to discriminate ionic particles from gamma rays.

The low-level discriminator setting is preferably determined by one of two conditions. The first condition occurs when decreasing the lower discriminator setting further does not result in additional 'true' neutron counts as determined by the PSD algorithm. The second condition is when further decreasing the lower discriminator setting causes the pulse processing to become substantially slowed due an excessive number of events being processed. The second condition would have a high system dead-time and may show an actual decrease in the effective neutron counting rate. The level of the upper-level discriminator can be determined by amplitude limitations of the pulse processing electronics. For example if input signals to an FPGA, described in greater detail below, are to be less than some value or the resulting processed output signal will be distorted, then the upper discriminator level would be set equal to or just below the level of the maximum input signal that the FPGA can process without distortion.

Embodiments of the invention can thus more accurately perform pulse shape discrimination with respect to gamma rays and neutrons. When quantified, the pulse shape discrimination is improved to an unexpectedly large degree. The dynamic range of any detection system is limited. It may be limited by the bit depth of the digitization, or by the voltage and current input tolerances of the electronic components. It may be limited by other components of the system. Detection systems that analyze both gamma ray and neutron signals can be restricted by dynamic range limitations. Natural gamma ray signals will have smaller amplitudes than neutron signals, in general. Some neutron signals will have similar amplitudes to gamma ray signals. Some neutron signal amplitudes will be greater than what is expected for even the highest energy gamma rays. To analyze signals with high fidelity, the system will have high dynamic range spanning the amplitudes of interest. Since gamma ray signals and neutron signals are disparate, amplitude-wise, much dynamic range goes to covering the entire energy spectrum, including high amplitude neutron signals. Often, too little dynamic range is left to perform precise analyses on individual signals. A properly set upper-level discriminator (ULD) removes the need to process high neutron amplitude signals with the existing dynamic range. Thus, Applicants have discovered that by having a ULD in place, the dynamic range can be set to process a shorter range of amplitudes and make analyses, such as PSD, more precise. Importantly, no neutron detections will be discarded. Furthermore, engineering flexibility is increased. Lower dynamic range processors are less expensive and faster. More comfortable trade-offs can be made regarding bit depth, speed, expense, and accuracy of pulse analysis.

Non-limiting embodiments as described below help to provide a better understanding of the concepts described herein.

Figure 3:
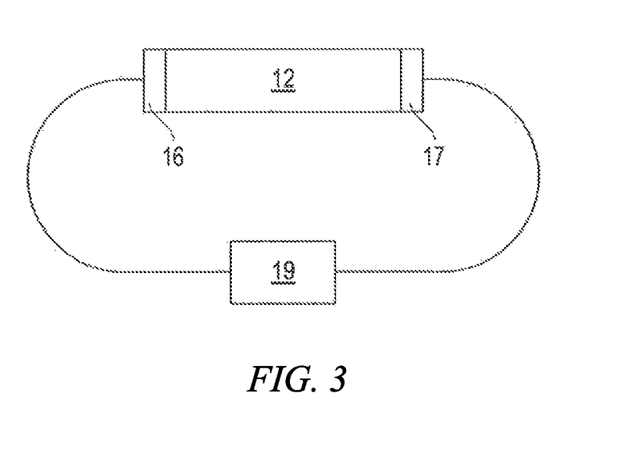
FIG. 3 is a schematic depiction of an embodiment of a neutron detector in accordance with embodiments described herein.

FIG. 3 includes a schematic depiction of an embodiment of a radiation detector 10. The radiation detector can be a medical imaging apparatus, a well logging apparatus, a security inspection apparatus, or the like. In a particular embodiment, the radiation detector 10 is used for neutron detection, and may also be used to detect gamma rays (a dual-mode radiation detector). In the embodiment illustrated in FIG. 3, the radiation detector 10 includes a radiation sensing element 12 and photosensors 16 and 17 that are optically coupled to the radiation sensing element 12. In an alternative embodiment (not illustrated), one of the photosensors 16 or 17 may be replaced by a reflector. Only one photosensor may be used with a reflector in place of the photosensor on the other side of the detector. The photosensors 16 and 17 are electrically coupled to an electronics module 109. Each of the radiation sensing element 12, photosensors 16 and 17, and electronic module are described in more detail below.

Figure 4:
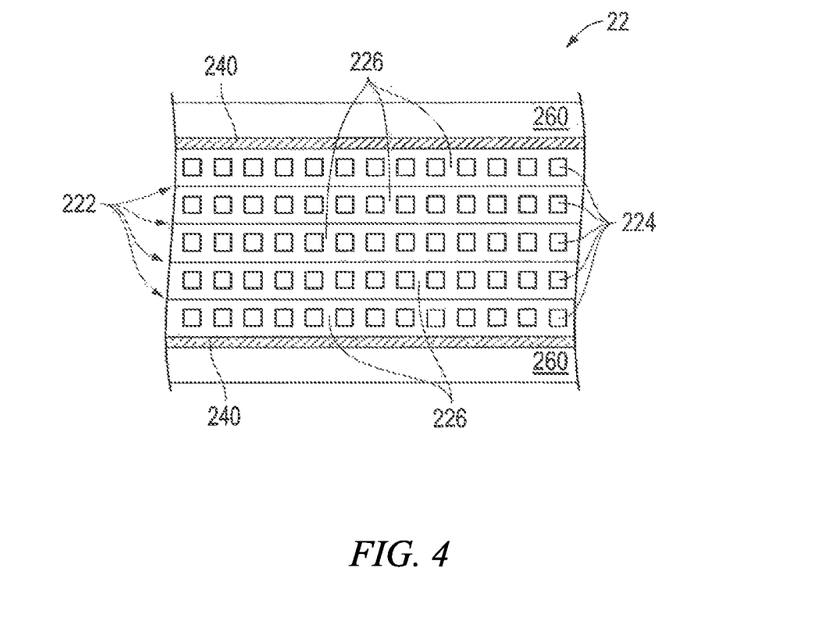
FIG. 4 is a cross-sectional view of a neutron sensor in accordance with a particular embodiment.

FIG. 4 includes a cross-sectional view of a particular embodiment of a neutron sensor 22, which is a non-limiting embodiment of the radiation sensing element 12. The neutron sensor 22 includes layers 222 of a radiation-sensitive material that can emit scintillating light in response to capturing targeted radiation. The radiation sensitive material can include $NaI:Tl$, $CsI:Tl$, $Bi_4Ge_3O_{12}$, $LaBr_3:Ce$, $LaCl_3:Ce$, $CaF_2:Eu$, $Gd_2SiO_5:Ce$, $GdI_3:Ce$, $Lu_{2-x}Y_xSiO_5$, wherein x is in a range of 0 to 2; $ZnS:Ag$, $ZnS:Cu$, $Y_2SiO_5:Ce$, $ZnO:Ga$, $ZnCdS:Cu$, $Cs_2LiYCl_6:Ce$, $Cs_2LiYCBr_6:Ce$ $Cs_2LiLaCl_6:Ce$, $Cs_2LiGdCl_6(Ce)$, $Cs_2LiLaBr_6:Ce$, $LiF(Ti)$, $LiI(Eu)$, Li$_6$Gd(BO$_3$)$_3$, or an organic liquid scintillator that includes an organic solvent, such as toluene, xylene, benzene, phenylcyclohexane, triethylbenzene, decalin, phenylxylyl ethane (PXE). The foregoing compounds can be useful in sensing gamma radiation. In addition, the neutron sensor 22 can include a neutron sensitive material, such as a compound including a neutron responsive element, such as $^{10}$B, $^{6}$Li, $^{113}$Cd, $^{157}$Gd, or any combination thereof. In a more particular embodiment, the neutron sensitive material can include $^{6}$LiF. An exemplary neutron sensor can include $^{6}$LiF and a ZnS and is commercially available as BC-704™-brand and BC-705™-brand scintillator products from Saint-Gobain Crystals of Hiram, Ohio, USA. When the neutron sensor includes $^{6}$LiF and a ZnS, the radiation-sensitive material can emit scintillating light when a thermal neutron or gamma ray is captured by the radiation-sensitive material. Thus, the mere emission of scintillating light from the radiation-sensitive material may not be isolated to a neutron or a gamma ray without a further analysis being made. The radiation-sensitive material can further include an organic binder, wherein the radiation-sensitive material is dispersed within the organic binder. Accordingly, the neutron sensor 22 can include an organic scintillator.

Scintillating light from the layers 222 passes through a clear epoxy 226 or another material that allows a substantial amount of light to be transmitted to and received by optical fibers 224. The optical fibers 224 can transmit scintillating light to one or both of the photosensors 16 and 17 (FIG. 1). In a particular embodiment, the optical fibers 224 can be in the form of a bundle at a location adjacent to one or both of the photosensors 16 and 17. The bundle can have a width of at least approximately 15 mm, at least approximately 25 mm, at least approximately 30 mm, or at least approximately 35 mm. In a more particular embodiment, the bundle can have a width of at least approximately 40 mm. Such widths, particular the larger widths can be significant as the size of the sensing area of the neutron detection apparatus increases. In particular applications where objects are to be analyzed, the ability to couple a wider optical bundle to a photosensor may make inspection of larger objects, such as vehicles (for example, trucks, boats, etc.) more economically feasible.

In an embodiment, the optical fibers 224 may not change the wavelength of the scintillating light. In another embodiment, the optical fibers 224 can change the wavelength of the scintillating light to a longer wavelength. In another embodiment, clear sheets, which do not change the wavelength, may be used in place of optical fibers. In another embodiment, wavelength shifting sheets can be used in place of wavelength shifting fibers. The wavelength shifted scintillating light is an example of a derivative of the scintillating light. Thus, in a particular embodiment, the optical fibers 224 can be wavelength shifting fibers. Such wavelength shifting fibers may be used when one or both of the photosensors 16 and 17 have a higher quantum efficiency for light at a longer wavelength as compared to the scintillating light. In a particular embodiment, the wavelength shifting fibers can shift the scintillating light to blue light or to green light.

A reflector 240 surrounds the combination of the layers 222, the optical fibers 224, and the clear epoxy 226 as illustrated in FIG. 4 to increase the amount of scintillating light received by the optical fibers 224. Further illustrated in FIG. 4 is a neutron moderator 260 that converts fast neutrons to thermal neutrons to increase the likelihood of capture by the phosphorescent material within the layers 222.

After reading this specification, skilled artisans will appreciate that the neutron sensor 22 is merely illustrative of a particular type of radiation sensing element 12. Other types and configurations of radiation sensing elements can be used without departing from the concepts as described herein.

The photosensors 16 and 17 can receive the scintillating light or a derivative thereof, such as the wavelength shifted light, and generate an electronic signal, such as an electronic pulse, in response to the scintillating light or its derivative. The photosensors 16 and 17 can be photomultiplier tubes ("PMTs"), semiconductor-based photomultipliers, or another suitable devices that generates an electronic pulse in response to the scintillating light. The electronic pulse from the photosensors 16 and 17 can be transmitted to the electronics module 109.

The electronics module 109 can include one or more amplifiers, discriminators, analog-to-digital signal converters, photon counters, other electronic components, or any combination thereof. A preferred electronics module includes at least a low-level discriminator, an upper-level discriminator, and a pulse shape discriminator. The electronics module 109 can be configured to detect particular radiation or detect more than one type of radiation. For example, the electronics module 109 can be configured to detect neutrons and discard pulses resulting from gamma rays or to detect both neutrons and gamma rays. Analysis may also incorporate one or more signal analysis algorithms in an application-specific integrated circuit (ASIC), an FPGA, or another similar device. For a neutron detector that is configured to detect neutrons, a counter can be incremented when a neutron is detected, and for a neutron detector that is configured to detect gamma rays, a different counter can be incremented when a gamma ray is detected.

Figure 5:
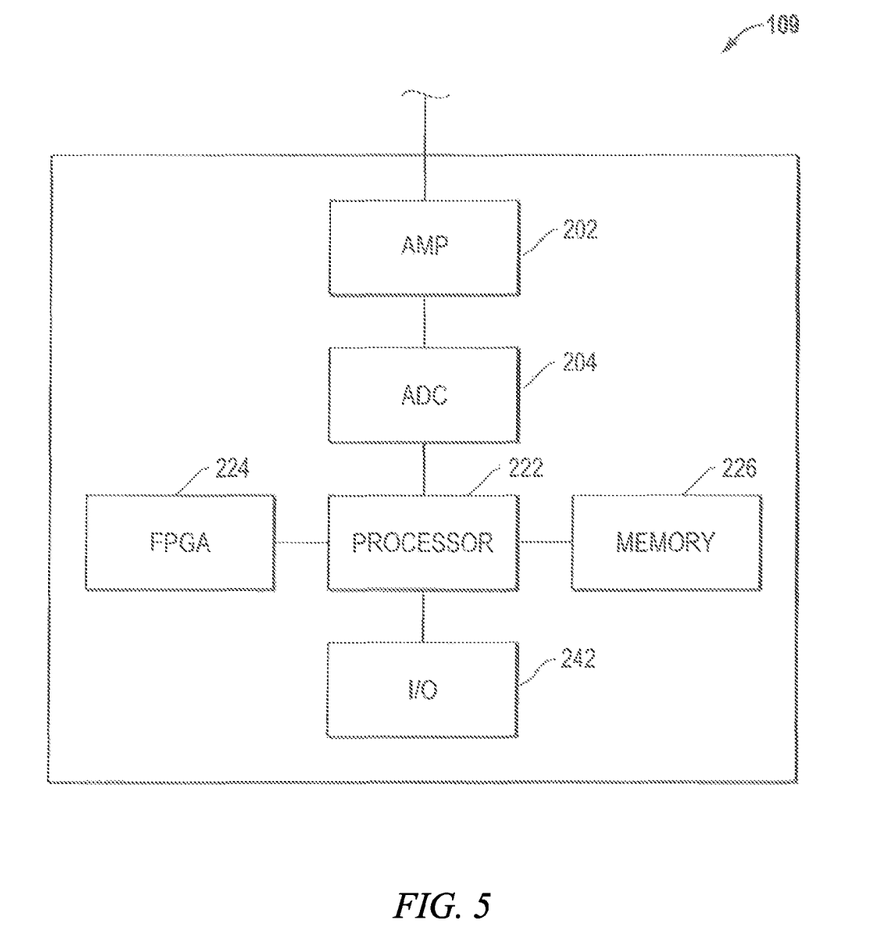
FIG. 5 is a schematic view of a portion of a control module in accordance with an embodiment.

FIG. 5 includes a schematic diagram of an illustrative, non-limiting embodiment of the control module 109. As illustrated, an amplifier 202 is coupled to an ADC 204, which is coupled to a processor 222. In an embodiment, the amplifier 202 can be a high fidelity amplifier. The processor 222 is coupled to a programmable/re-programmable processing module (PRPM), such as an FPGA 224 or ASIC, a memory 226, and an input/output (I/O) module 242. The couplings may be unidirectional or bidirectional. The functions provided by the components are discussed in more detail below. In another embodiment, more, fewer, or different components can be used in the control module 109. For example, functions provided by the FPGA 224 may be performed by the processor 222, and thus, the FPGA 224 is not required. The FPGA 224 can act on information faster than the processor 222.

Figure 6A:
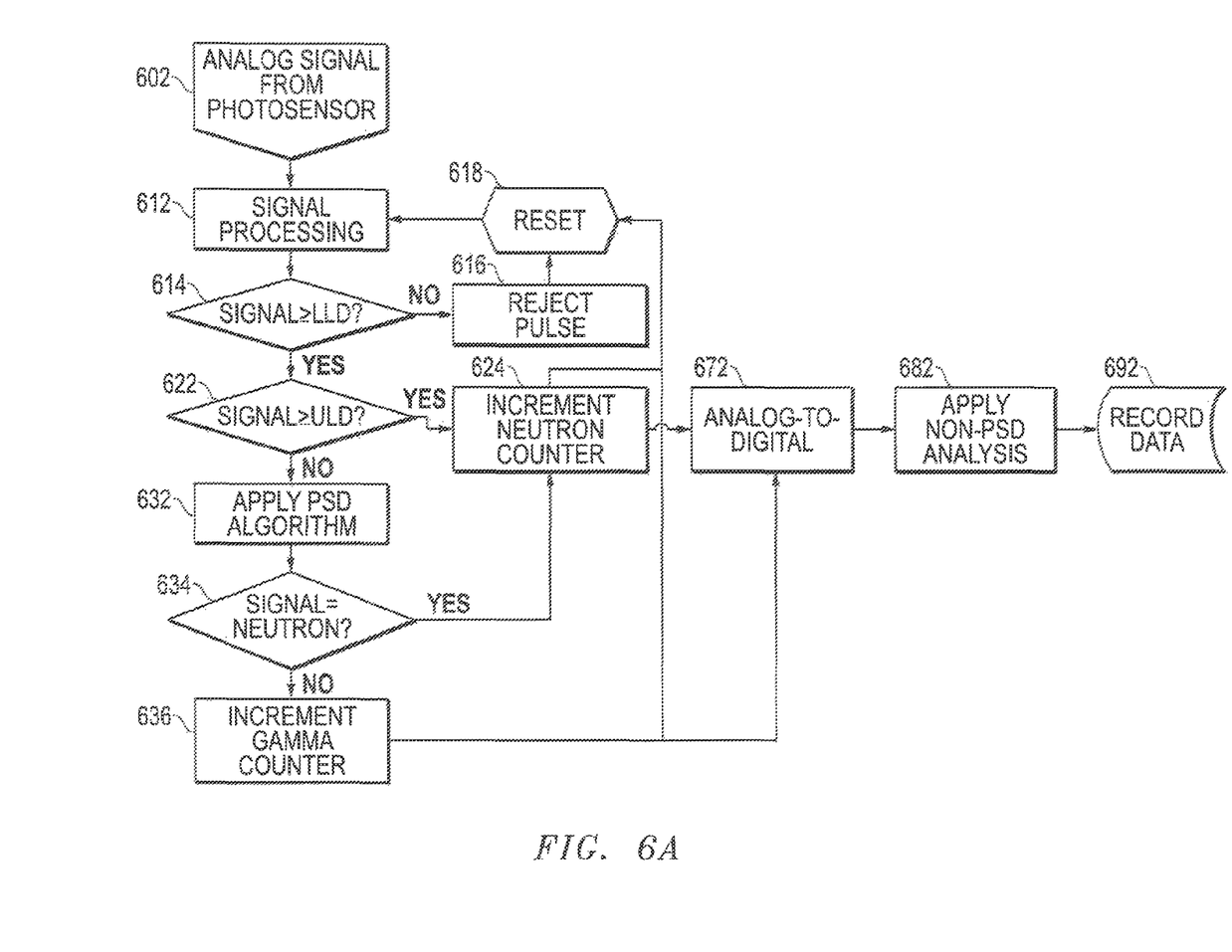
FIG. 6A is a block diagram showing the steps in an analog implementation of a neutron detector according to an embodiment of the present invention.

FIG. 6A is a block diagram showing the steps in an analog implementation of a radiation detector according to an embodiment of the present invention. The method can include receiving an analog signal from a photosensor, such as photosensor 16, 17 or both, at reference 602 in FIG. 6A. The method can further include processing the signal. In an embodiment, the processing can include amplifying the analog signal, at block 612, integrating the signal, shaping the signal, or the like. A determination is made whether the signal is at least at a threshold value for the low-level discriminator, at decision tree 614. If not, the pulse is rejected (block 616), and the analog process is reset (hexagon 618). Otherwise (yes branch from decision tree 614), a determination is made whether the signal is at least at a threshold value for the higher-level discriminator, at decision tree 622. If yes, the neutron counter is incremented at block 624. Otherwise (no branch from decision tree 622), a pulse shape discrimination algorithm is applied to the signal, at block 632. If a determination is made whether the signal corresponds to a neutron, at decision tree 634. If yes, the neutron counter is incremented, at block 624. If not (no branch from decision tree 634), the gamma counter is incremented at block 636. From the counters, the analog signal is converted to a digital signal, at block 672. The conversion can be performed using the ADC as previously described. Further analysis can be performed on the digital signal. In an embodiment, such further analysis may not correspond to pulse shaped discrimination. For example, such further analysis can include determining the energy of the scintillation pulse, timing characteristics (such as rise time, decay time, or both), or other parameters. The data is then recorded at block 692.

Figure 6B:
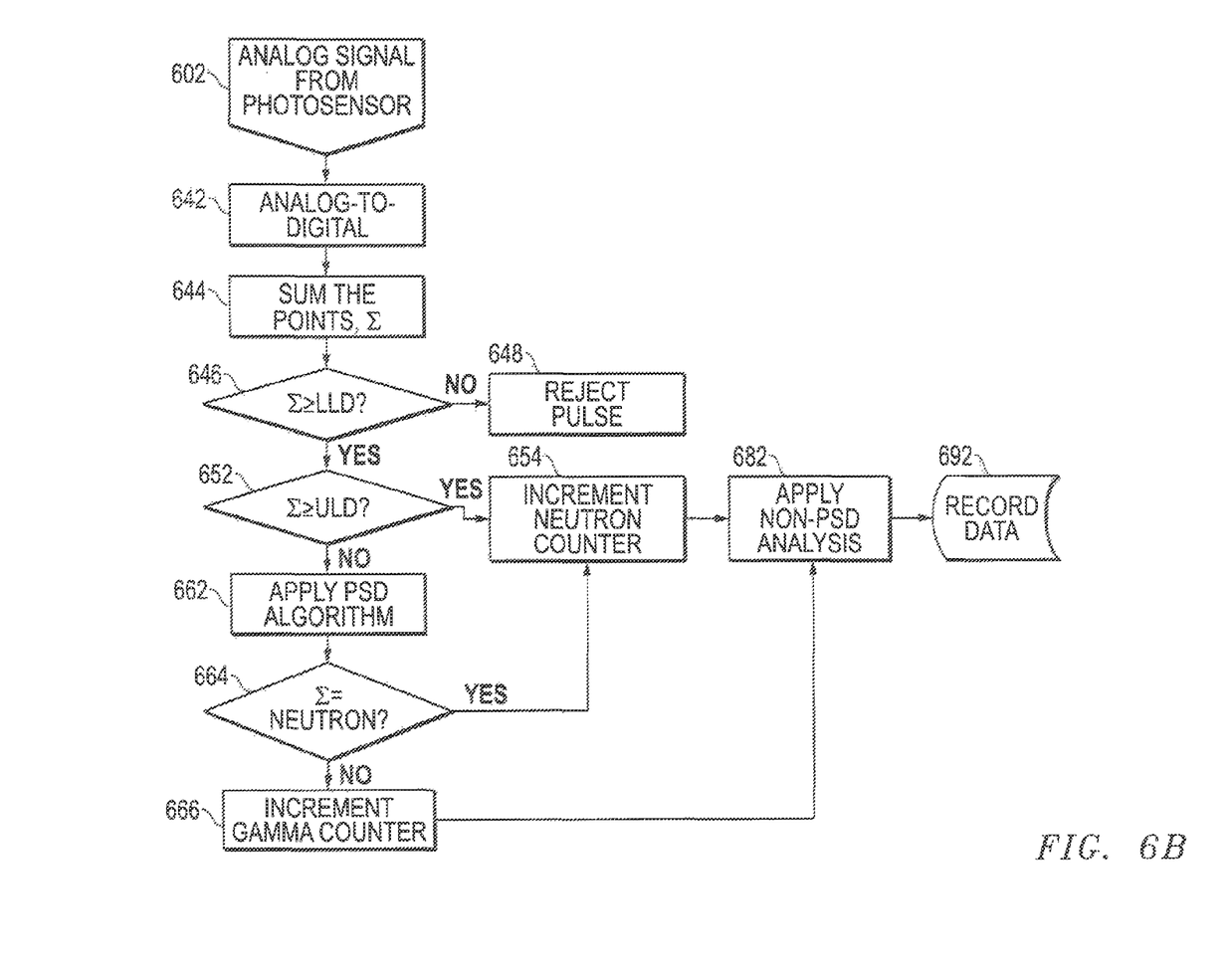
FIG. 6B is a block diagram showing the steps in a digital implementation of a neutron detector according to an embodiment of the present invention.

FIG. 6B is a block diagram showing the steps in a digital implementation of a radiation detector according to an embodiment of the present invention. The digital process is similar but can be simplified due to converting the signal from an analog form to a digital form earlier in the process flow. Referring to FIG. 6B, an analog signal is received from a photosensor, at block 602. The analog signal is then converted to a digital signal using an ADC, at block 642. A summation is performed on the data from the ADC, at block 644. The summation is then compared to a threshold value of the low-level discriminator, at decision tree 646. If the summation is lower than the threshold, the pulse is rejected at block 648. Otherwise (yes branch of decision tree 646), the summation is compared to a threshold value of the upper-level discriminator, at decision tree 652. If the summation is greater than the threshold, a neutron counter is incremented, at block 654. Otherwise (no branch of decision tree 652), a pulse shaped discrimination algorithm is applied, at block 662. A determination is made whether the summation corresponds to a neutron, at decision tree 644. If the summation corresponds to a neutron, the neutron counter is incremented at block 654. Otherwise (no branch of decision tree 644), the gamma counter is incremented, at block 666. Similar to FIG. 6A, further analysis is performed, at block 682, and the data is recorded, at block 692.

Some or all of the functions described with respect to the FPGA 224 may be performed by the processor 222, and therefore, the FPGA 224 is not required in all embodiments. Further, the FPGA 224, the memory 226, the I/O module 242, or any combination thereof may be within the same integrated circuit, such as the processor 222. In another embodiment, the control module 109 does not need to be housed within the radiation detection apparatus 102.

Figure 7:
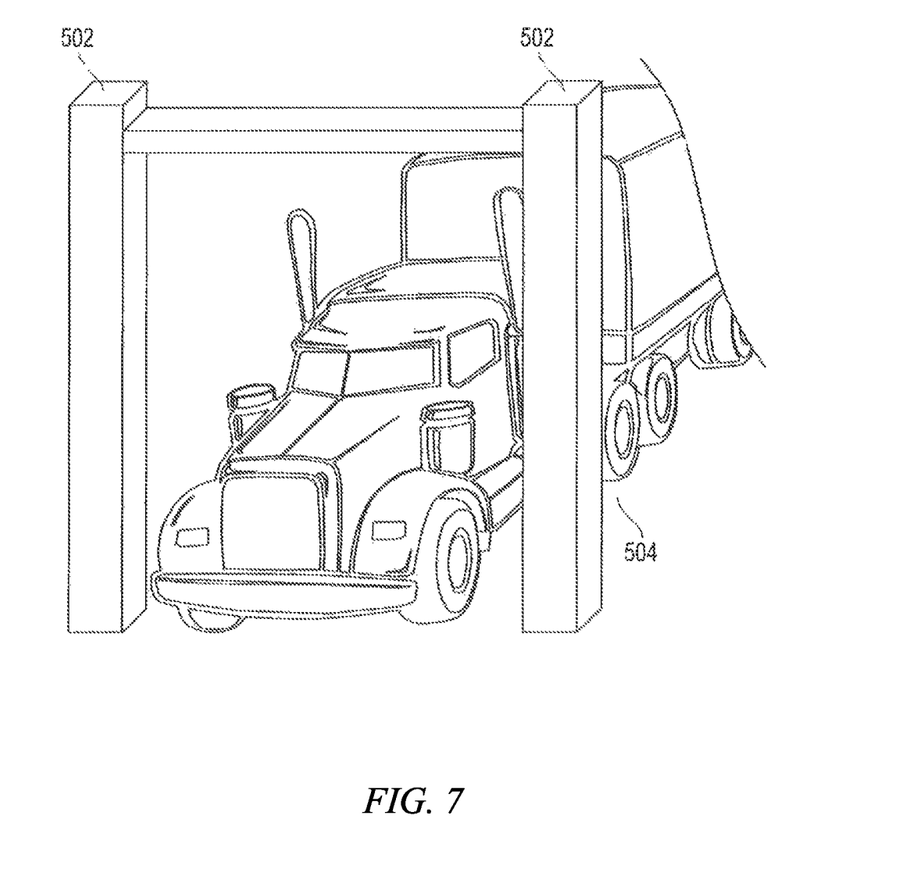
FIG. 7 shows a perspective view of a neutron detector according to an embodiment in use.

The radiation detector 10 according to embodiments of the invention can be used for a variety of different applications. In a particular embodiment illustrated in FIG. 7, a neutron detector 502, which is a particular type of the radiation detector 10, can be used as a security inspection apparatus. The neutron detector 502 can include one or more neutron sensors and photosensor arrangements (not separately illustrated in FIG. 7) as described herein. The neutron sensor(s) can be of any of the previously described neutron sensors. As illustrated in FIG. 7, the neutron sensor(s) may be located within either or both of the vertical columns, the horizontal cross member, or any combination thereof.

When in use, an object can be placed near or pass through an opening within neutron detection apparatus 502. As illustrated in the embodiment of FIG. 7, the object 504 is a vehicle, and in particular, a truck. The neutron detection apparatus 502 can capture at least part of the targeted radiation emitted by the object (not illustrated) within the vehicle. The neutron sensors can emit scintillating light or wavelength shifted light that is converted to an electronic signal by the photosensors. The electronic signal can be transmitted to an electronics module (not illustrated in FIG. 7 for further analysis.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of described herein might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In particular, methods described herein may be implemented by a series of computer-executable instructions residing on a storage medium such as a physical (e.g., non-transitory) computer-readable medium. In addition, although specific embodiments of the invention may employ object-oriented software programming, the invention is not so limited and is easily adapted to employ other forms of directing the operation of a computer.

Portions of the invention can also be provided in the form of a computer program product comprising a physical computer readable medium having computer code thereon. A computer readable medium can include any physical medium capable of storing computer code thereon for use by a computer, including optical media such as read only and writeable CD and DVD, magnetic memory or medium (e.g., hard disk drive), semiconductor memory (e.g., FLASH memory and other portable memory cards, etc.), etc.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa. Embodiments may be in accordance with any one or more of the items as listed below.

Item 1. A radiation detector comprising:
a radiation sensing element that is configured to produce light in response to capturing radiation;
a photosensor optically coupled to the radiation sensing element and operative to convert light emitted by the radiation sensing element into an electronic signal pulse;
a low-level discriminator to identify a pulse from the photosensor below a first energy level or a first amplitude as a noise pulse;
an upper-level discriminator to identify a pulse from the photosensor above a second energy level or a second amplitude as a neutron pulse or an ionic particle pulse; and
a pulse-shape discriminator to process a pulse having an energy of at least the first energy level and no greater than the second energy level to discriminate between pulses corresponding to neutrons or ionic particles and pulses corresponding to gamma rays or other radiation without an ionic particle.

Item 2. The radiation detector of Item 1, wherein the non-neutron radiation comprises gamma radiation.

Item 3. The radiation detector of Item 1, wherein the radiation sensing element comprises a scintillator.

Item 4. The radiation detector of Item 3, wherein the scintillator comprises a solid scintillator.

Item 5. The radiation detector of Item 3, wherein the scintillator comprises a plastic scintillator.

Item 6. The radiation detector of Item 3, wherein the scintillator comprises at least one scintillator screen comprising neutron absorber materials.

Item 7. The radiation detector of Item 3, wherein the scintillator comprises a primary fluorescent emitter suspended in a solid polymer matrix.

Item 8. The radiation detector of Item 3, wherein the scintillator comprises a $^6$Li-based scintillator or a $^{10}$B-based scintillator.

Item 9. The radiation detector of Item 3, wherein the scintillator comprises a phosphor screen based on $^6$LiF/ZnS:Ag or $^6$LiF/ZnS:Cu.

Item 10. The radiation detector of Item 3, wherein the scintillator comprises a scintillation screen comprising LiF mixed with ZnS:Ag in a hydrogenous binder.

Item 11. The radiation detector of Item 1, wherein the pulse-shape discriminator is configured to analyze a pulse shape of the electronic signal pulse comprising pulse amplitude as a function of time.

Item 12. The radiation detector of Item 1, wherein the pulse-shape discriminator is configured to analyze a pulse shape of the electronic signal pulse to discriminate between gamma interactions and neutron interactions.

Item 13. The radiation detector of Item 1, further comprising a counter for counting all pulses above a second energy level and all pulses identified as neutron pulses by the pulse-shape discriminator.

Item 14. The radiation detector of Item 1, wherein the photosensor comprises at least one of a photomultiplier tube, a hybrid photomultiplier, or a photodiode.

Item 15. The radiation detector Item 1, further comprising a wavelength shifter configured to receive light from the scintillator and shift a wavelength of the light to a longer wavelength before the light reaches the photosensor.

Item 16. The radiation detector of Item 1, further comprising a light pipe disposed between the radiation sensing element and the photosensor.

Item 17. The radiation detector of Item 1, wherein a fraction of gamma ray pulses erroneously counted as a neutron pulse is no more than one per million.

Item 18. A module for a radiation detector comprising:
a low-level discriminator that is configured to reject any signal pulse below a first energy level or a first amplitude;
an upper-level discriminator that is configured to identify any signal pulse above a second energy level of a second amplitude as a neutron pulse or an ionic particle pulse; and
a pulse-shape discriminator that is configured to process only signal pulses of at least the first energy level or the first amplitude and no greater than the second energy level or the second amplitude and identifies each pulse as:
(1) a neutron pulse or an ionic particle pulse; or
(2) gamma rays or one or both of a non-neutron pulse or non-ionic pulse.

Item 19. A method of using a radiation detector comprising:
providing the radiation detector comprising a radiation sensing element optically coupled to a photosensor;
producing light at the radiation sensing element in response to interacting with neutron or non-neutron radiation;
receiving an electronic signal pulse from the photosensor when light from the radiation sensing element is received by the photosensor;
comparing an energy level or an amplitude of the electronic pulse to a first discrimination value and rejecting the electronic pulse when the energy level or the amplitude is below the first discrimination value;
comparing the energy level of the amplitude of the electronic pulse to a second discrimination value and identifying the electronic pulse as a neutron pulse or an ionic particle pulse when the amplitude is above the second discrimination value;
when the energy level or the amplitude is at least as high as the first discrimination value and no greater than the second discrimination value, applying pulse-shape discrimination to identify a radiation corresponding to the pulse.

Item 20. The method of Item 19, wherein the method is performed to identify radiation captured by the radiation sensing element as a neutron or as gamma radiation.

Item 21. A radiation detector comprising:
a scintillator;
a photosensor optically coupled to the scintillator and operative to convert photons emitted by the scintillator into an electronic signal pulse;
a low-level discriminator to identify a pulse from the photosensor below a first energy level as a noise pulse;
an upper-level discriminator to identify a pulse from the photosensor above a second energy level as a neutron pulse; and
a pulse-shape discriminator to process a pulse having an energy of at least the first energy level and no greater than the second energy level to discriminate between pulses corresponding to neutrons and pulses corresponding to gamma rays.

Item 22. A radiation detector comprising:
a radiation sensing element that is configured to produce light in response to capturing neutron and non-neutron radiation;
a photosensor optically coupled to the radiation sensing element that is configured to convert the light into a signal pulse;
a low-level discriminator that is configured to reject any signal pulse below a first amplitude;
an upper-level discriminator that is configured to identify any signal pulse above a second amplitude as a neutron pulse;
a pulse-shape discriminator that is configured to apply a pulse-discrimination algorithm only to signal pulses of at least the first amplitude and no greater than the second amplitude, the pulse-discrimination algorithm being capable of identifying each pulse as either a non-neutron pulse or a neutron pulse based upon the decay time of the pulse.

Item 23. A module for a radiation detector that is capable of producing an electronic signal pulse in response to radiation captured by the radiation detector comprising:
a low-level discriminator that is configured to reject any signal pulse below a first amplitude;
an upper-level discriminator that is configured to identify any signal pulse above a second amplitude as a neutron pulse; and a pulse-shape discriminator that is configured to process only signal pulses of at least the first amplitude and no greater than the second amplitude and identifies each pulse as either a non-neutron pulse or a neutron pulse based upon a decay time of the pulse.

Item 24. A method of using a radiation detector comprising:
providing the radiation detector comprising a radiation sensing element optically coupled to a photosensor;
producing light at the radiation sensing element in response to interacting with neutron or non-neutron radiation;
receiving an electronic signal pulse from the photosensor when light from the radiation sensing element is received by the photosensor;
comparing an amplitude of the electronic pulse to a first discrimination value and rejecting the electronic pulse when the amplitude is below the first discrimination value;
comparing the amplitude of the electronic pulse to a second discrimination value and identifying the electronic pulse as a neutron pulse when the amplitude is above the second discrimination value;
when the amplitude is at least as high as the first discrimination value and no greater than the second discrimination value, applying pulse-shape discrimination to identify the pulse as either a non-neutron pulse or a neutron pulse.

Item 25. A radiation detector comprising:
a scintillator;
a photosensor optically coupled to the scintillator and operative to convert photons emitted by the scintillator into an electronic signal pulse;
a low-level discriminator to identify a pulse from the photosensor below a first energy level as a noise pulse;
an upper-level discriminator to identify a pulse from the photosensor above a second energy level as an ionic particle pulse; and
a pulse-shape discriminator to process a pulse having an energy of at least the first energy level and no greater than the second energy level to discriminate between pulses corresponding to ionic particles and pulses corresponding to non-ionic particles.

Item 26. The radiation detector or the method of any one of Items 2 to 5, wherein the non-neutron radiation comprises gamma radiation.

Item 27. The radiation detector or the method of any one of Items 2, 4, and 6, wherein the radiation sensing element comprises a scintillator.

Item 28. The radiation detector or the method of any one of the preceding Items, wherein the scintillator or the radiation sensing element comprises a solid scintillator.

Item 29. The radiation detector or the method of any one of the preceding Items, wherein the scintillator or the radiation sensing element comprises a plastic scintillator.

Item 30. The radiation detector or the method of any one of the preceding Items, wherein the scintillator or the radiation sensing element comprises at least one scintillator screen comprising neutron absorber materials.

Item 31. The radiation detector or the method of any one of the preceding Items, wherein the scintillator or the radiation sensing element comprises a primary fluorescent emitter suspended in a solid polymer matrix.

Item 32. The radiation detector or the method of any one of the preceding Items, wherein the scintillator or the radiation sensing element comprises a $^6$Li-based scintillator or a $^{10}$B-based scintillator.

Item 33. The radiation detector or the method of any one of the preceding Items, wherein the scintillator or the radiation sensing element comprises a phosphor screen based on $^6$LiF/ZnS:Ag or $^6$LiF/ZnS:Cu.

Item 34. The radiation detector or the method of any one of the preceding Items, wherein the scintillator or the radiation sensing element comprises a scintillation screen comprising LiF mixed with ZnS(Ag) in a hydrogenous binder.

Item 35. The radiation detector or the method of any one of the preceding Items, wherein the pulse-shape discriminator is configured to analyze a pulse shape of the electronic signal pulse comprising pulse amplitude as a function of time.

Item 36. The radiation detector or the method of any one of the preceding Items, wherein the pulse-shape discriminator is configured to analyze a pulse shape of the electronic signal pulse to discriminate between gamma interactions and neutron interactions.

Item 37. The radiation detector or the method of any one of the preceding Items, further comprising a counter for counting all pulses above a second energy level and all pulses identified as neutron pulses by the pulse-shape discriminator.

Item 38. The radiation detector or the method of any one of the preceding Items, wherein the photosensor comprises at least one of a photomultiplier tube, a hybrid photomultiplier, or a photodiode.

Item 39. The radiation detector or the method of any one of the preceding Items, further comprising a wavelength shifter configured to receive light from the scintillator and shift a wavelength of the light to a longer wavelength before the light reaches the photosensor.

Item 40. The radiation detector or the method of any one of the preceding Items, further comprising a light pipe disposed between the scintillator and the photosensor.

Item 41. The radiation detector or the method of any one of the preceding Items, wherein the fraction of gamma ray pulses erroneously counted as a neutron pulse is no more than one per million.

Note that not all of the activities described above in the general description or the examples are required, that a portion of a specific activity may not be required, and that one or more further activities may be performed in addition to those described. Still further, the order in which activities are listed is not necessarily the order in which they are performed.

The concepts described herein have broad applicability and can provide many benefits as described and shown in the examples above. The embodiments will vary greatly depending upon the specific application, and not every embodiment will provide all of the benefits and meet all of the objectives that are achievable by the invention. Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Although the embodiments and their advantages have been described in detail, it should be understood that various changes, substitutions and alterations can be made to the embodiments described herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the concepts described herein. Accordingly, the appended claims are intended to include within their scope such processes, machines, manufacture, compositions of matter, means, methods, or steps.

What is claimed is:

1. A radiation detector comprising:
   a radiation sensing element that is configured to produce light in response to capturing radiation;
   a neutron moderator that converts a fast neutron to a thermal neutron;
   a photosensor optically coupled to the radiation sensing element and operative to convert light emitted by the radiation sensing element into an electronic signal pulse;
   a low-level discriminator to identify a pulse from the photosensor below a first energy level or a first amplitude as a noise pulse;
   an upper-level discriminator to identify a pulse from the photosensor above a second energy level or a second amplitude as a neutron pulse or an ionic particle pulse;
   a pulse-shape discriminator to process a pulse having an energy of at least the first energy level and no greater than the second energy level to discriminate between pulses corresponding to neutrons or ionic particles and pulses corresponding to gamma rays or other radiation without an ionic particle; and
   a neutron counter configured to count a pulse as the neutron pulse or the ionic particle pulse after the pulse is identified by the pulse-shape discriminator as corresponding to the neutron pulse or the ionic particle pulse.

2. The radiation detector of claim 1, wherein a non-neutron radiation comprises gamma radiation.

3. The radiation detector of claim 1, wherein the radiation sensing element comprises a scintillator.

4. The radiation detector of claim 3, wherein the scintillator comprises a solid scintillator.

5. The radiation detector of claim 1, wherein the radiation detector is a security inspection apparatus.

6. The radiation detector of claim 3, wherein the scintillator comprises at least one scintillator screen comprising neutron absorber materials.

7. The radiation detector of claim 3, wherein the scintillator comprises a primary fluorescent emitter suspended in a solid polymer matrix.

8. The radiation detector of claim 1, wherein the neutron counter is further configured to count a pulse as the neutron pulse or the ionic particle pulse after the pulse is identified by the upper-level discriminator as being above the second energy level or the second amplitude.

9. The radiation detector of claim 3, wherein the scintillator comprises a phosphor screen based on $^6$LiF/ZnS:Ag or $^6$LiF/ZnS:Cu.

10. The radiation detector of claim 3, wherein the scintillator comprises a scintillation screen comprising LiF mixed with ZnS:Ag in a hydrogenous binder.

11. The radiation detector of claim 1, wherein the pulse-shape discriminator is configured to analyze a pulse shape of the electronic signal pulse comprising pulse amplitude as a function of time.

12. The radiation detector of claim 1, wherein the pulse-shape discriminator is configured to analyze a pulse shape of the electronic signal pulse to discriminate between gamma interactions and neutron interactions.

13. The radiation detector of claim 1, further comprising a counter for counting all pulses above a second energy level and all pulses identified as neutron pulses by the pulse-shape discriminator.

14. The radiation detector of claim 1, wherein the photosensor comprises at least one of a photomultiplier tube, a hybrid photomultiplier, or a photodiode.

15. The radiation detector claim 1, further comprising a wavelength shifter configured to receive light from the scintillator and shift a wavelength of the light to a longer wavelength before the light reaches the photosensor.

16. The radiation detector of claim 1, further comprising a light pipe disposed between the radiation sensing element and the photosensor.

17. The radiation detector of claim 1, wherein a fraction of gamma ray pulses erroneously counted as a neutron pulse is no more than one per million.

18. A module for a radiation detector comprising:
- a low-level discriminator that is configured to reject any signal pulse below a first energy level or a first amplitude;
- an upper-level discriminator that is configured to identify any signal pulse above a second energy level of a second amplitude as a neutron pulse or an ionic particle pulse;
- a pulse-shape discriminator that is configured to process only signal pulses of at least the first energy level or the first amplitude and no greater than the second energy level or the second amplitude and identifies each pulse as:
  - (1) the neutron pulse or the ionic particle pulse; or
  - (2) gamma rays or one or both of a non-neutron pulse or non-ionic pulse; and
- a neutron counter configured to receive an input from the upper-level discriminator and another input from the pulse-shape discriminator and count a signal pulse as the neutron pulse or the ionic particle pulse after the signal pulse is identified as corresponding to the neutron pulse or the ionic particle pulse by upper-level discriminator or the pulse-shape discriminator.

19. A method of using a security inspection apparatus comprising:
- providing the security inspection apparatus comprising a neutron moderator to convert a fast neutron to a thermal neutron, and a radiation sensing element optically coupled to a photosensor;
- producing light at the radiation sensing element in response to interacting with neutron or non-neutron radiation;
- receiving an electronic signal pulse from the photosensor when light from the radiation sensing element is received by the photosensor;
- comparing an energy level or an amplitude of the electronic pulse to a first discrimination value and rejecting the electronic pulse when the energy level or the amplitude is below the first discrimination value;
- comparing the energy level of the amplitude of the electronic pulse to a second discrimination value and identifying the electronic pulse as a neutron pulse or an ionic particle pulse when the energy level or the amplitude is above the second discrimination value; and
- when the energy level or the amplitude is at least as high as the first discrimination value and no greater than the second discrimination value, applying pulse-shape discrimination to identify a radiation captured by the radiation sensing element as a neutron or as gamma radiation.

20. The module of claim 18, wherein the neutron counter is configured to count pulses as the neutron pulse or the ionic particle pulse as a sum of (1) any signal pulses is identified by the upper-level discriminator as being above the second energy level or the second amplitude and (2) any signal pulse identified by the pulse-shape discriminator as the neutron pulse or the ionic particle pulse.

* * * * *